United States Patent [19]

Ireland

[11] Patent Number: 5,694,347

[45] Date of Patent: Dec. 2, 1997

[54] DIGITAL SIGNAL PROCESSING SYSTEM

[75] Inventor: Thomas C. Ireland, Torrance, Calif.

[73] Assignee: Hughes Electronics, Los Angeles, Calif.

[21] Appl. No.: 752,773

[22] Filed: Nov. 20, 1996

Related U.S. Application Data

[63] Continuation of Ser. No. 321,380, Oct. 11, 1994, abandoned, which is a continuation of Ser. No. 74,692, Jun. 10, 1993, abandoned, which is a continuation of Ser. No. 810,270, Dec. 19, 1991, abandoned.

[51] Int. Cl.$^6$ .................................................. G06F 15/00
[52] U.S. Cl. ............................................................ 364/726
[58] Field of Search ................................ 364/724.01, 725, 364/726, 728.01, 736

[56] References Cited

U.S. PATENT DOCUMENTS

| | | | |
|---|---|---|---|
| 3,702,393 | 11/1972 | Fuss | 364/726 |
| 3,892,956 | 7/1975 | Fuss | 364/726 |
| 4,138,730 | 2/1979 | Ali | 364/726 |
| 4,501,149 | 2/1985 | Konno et al. | 364/726 X |
| 4,534,009 | 8/1985 | McGee | 364/726 |
| 4,601,006 | 7/1986 | Liu | 364/726 |

*Primary Examiner*—Chuong Dinh Ngo
*Attorney, Agent, or Firm*—Leonard A. Alkov; Wanda K. Denon-Low

[57] ABSTRACT

A method for computing a fast Fourier Transform of an input signal which includes the steps of: a) storing first and second data values and a first coefficient in a first register stage; b) storing the first and second data values and the first coefficient in a second register stage and storing third and fourth data values in the first register stage along with a second coefficient; c) multiplying the second data value by the first coefficient and storing the product in a third register stage along with the first data value, moving the third and fourth data values into the second register stage along with the second coefficient and storing fifth and sixth data values in the first register stage along with a third coefficient; d) combining the first data value with the product of the first coefficient and the second data value and storing the result in a fourth register stage; e) combining the third data value with the product of the second coefficient and the fourth data value and storing the result in the fourth register stage; and f) passing terms generated by steps d) and e) to a first register stage of a subsequent processing stage and repeating steps a) through f) until the fast Fourier transform of the input signal is generated.

1 Claim, 13 Drawing Sheets

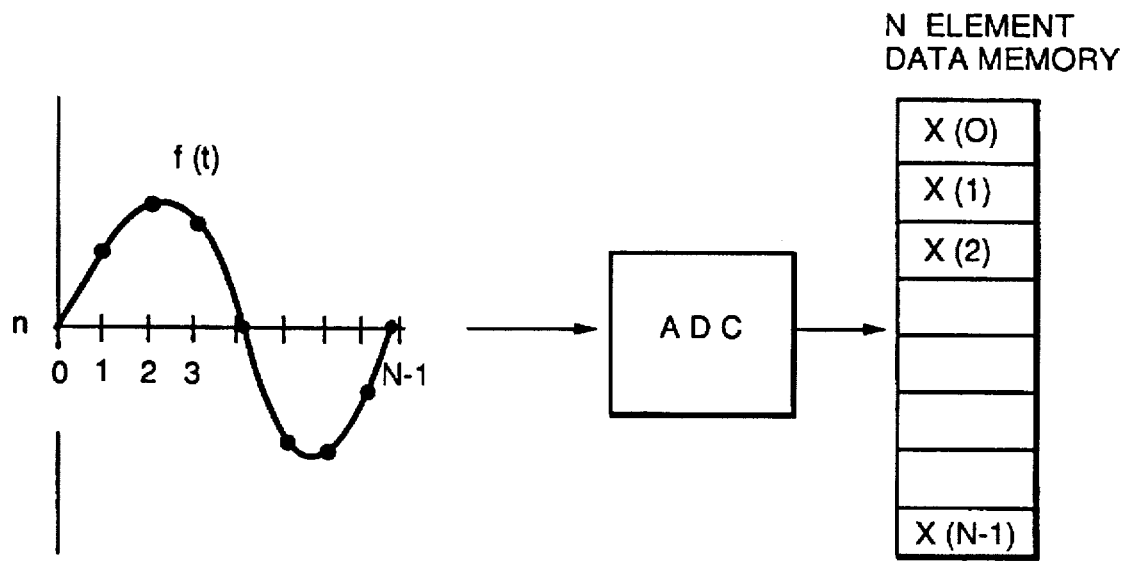
FIG. 1.
(PRIOR ART)
FIG. 3. (PRIOR ART)
"BUTTERFLY" OPERATOR
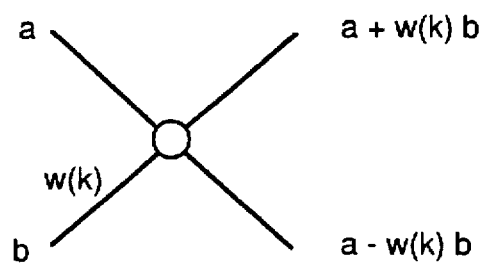

DIGITAL SIGNAL PROCESSING SYSTEM

This is a continuation application Ser. No. 08/321,380, filed Oct. 11, 1994, now abandoned, which is a continuation application Ser. No. 08/074,692, filed Jun. 10, 1993 now abandoned, which is a continuation of application Ser. No. 07/810,270, filed Dec. 19, 1991 now abandoned.

BACKGROUND OF THE INVENTION

1. Field of the Invention

The present invention relates to digital signal processing systems. More specifically, the present invention relates to digital signal processing systems which compute Fast Fourier Transforms (FFTs).

While the present invention is described herein with reference to an illustrative embodiment for a particular application, it is understood that the invention is not limited thereto. Those having ordinary skill in the art and access to the teachings provided herein will recognize additional modifications, applications and embodiments within the scope of the present invention.

2. Description of the Related Art

Many signal processing applications require the extraction of fundamental frequency components from a given signal. In radar systems, for example, the frequency components of the signals reflected from a target are used to compute the velocity of the target. In speech recognition systems, measurement of the frequency spectrum of a voice signal is a prerequisite to further analysis of the signal.

In a typical digital signal processing system, a continuous periodic input signal, f(t) is sampled N times over one period. At each sample point, an analog-to-digital (A/D) converter converts the instantaneous amplitude of the input signal f(t) into a corresponding digital value x(n) where n ranges from zero to N−1. The resulting series of sampled values x(n) are then stored in an N-element data memory, as shown in FIG. 1.

The Fast Fourier Transform (FFT) of equation [1] below is a standard algorithm employed in digital signal processing systems to extract the fundamental frequency components of a given input signal.

$$X(k) = \sum_{n=0}^{n/2-1} x_{even}(n) \, W_{N/2}^{nk} + w^k \sum_{n=0}^{n/2-1} x_{odd}(n) \, W_{N/2}^{nk} \quad [1]$$

This algorithm transforms an input sequence of sampled values x(n) into an output sequence X(k), in which each term represents the amplitude of a component sinusoidal signal (of frequency kw) contained in the original input signal.

The total number of individual operations required to produce an N-point FFT can be substantially reduced by decomposing the original N-point FFT into a series of smaller FFTs. For example, a 16-point FFT can be decomposed into two 8-point FFTs, which can be further decomposed into four 4-point FFTs, etc. Each decomposition step (N/2) reduces the total number of operations required to produce the N-point FFT by approximately 50%. The basic FFT algorithm can be implemented in several ways due to the variety of possible decomposition arrangements.

The structure of a particular FFT implementation and the operations performed thereby are often described using a flow-diagram such as that shown in FIG. 2. The mathematical operations performed on each pair of input terms are represented by the "butterfly" operator depicted in FIG. 3. The open circle represents an adder-subtractor, which outputs the sum of the two input terms at the top and the difference of the two input terms at the bottom. A constant (Wk) which multiplies an input term is written immediately after the input term.

The 16-point FFT shown in FIG. 2 consists of four successive calculation stages. Each calculation stage performs 8 butterfly operations on the 8 pairs of inputs from the previous stage, producing 8 pairs of output results.

The calculation stages illustrated in the flow diagram of FIG. 2 can be physically implemented using a combination of readily available hardware devices. A conventional hardware implementation of this flow diagram is shown in FIG. 4. The original 16-point input sequence is divided into two 8-point sequences which are stored in first and second data memories (DM1 and DM2). The coefficient required for the first stage of calculations (W1) is stored in a third data memory (DM3).

The first stage of calculations (8 butterfly operations on 8 input data pairs) shown in the flow diagram of FIG. 2 are performed by a first Signal Processing Element (SPE1). The Signal Processing Element (SPE1) performs the basic butterfly operation (shown in FIG. 3) on each of the 8 pairs of input values stored in data memories DM1 and DM2. The resulting 8 pairs of output values are stored in a fourth and fifth data memory DM4 and DM5 respectively.

The eight pairs of output values produced by the first calculation stage (stored in DM4 and DM5) are then used as 8 pairs of inputs to the second calculation stage. A second Signal Processing Element (SPE2) performs the butterfly operation on each of the eight pairs of input values contained in data memories DM4 and DM5. The resulting 8 pairs of output values are stored in data memories DM7 and DM8.

This process is repeated for the subsequent calculation stages (stage 3 and stage 4). The final 8 pairs of output values (stored in data memories DM13, DM14) constitute the final output sequence X(k) of the 16-point FFT.

Although the conventional FFT hardware architecture described previously has been used for many years, there are two significant problems associated with this approach. The first problem is that each calculation stage requires two data memories (of size N/2) to store the series of N input values to be processed. For this reason, the memory storage requirements to calculate even a medium sized FFT (N=1024) can be prohibitive.

The second problem is that each calculation stage incurs a significant time delay, since all N output values must be computed before the following stage can begin processing the results from the preceding stage.

Accordingly, there is a need in the art for an improved FFT digital signal processing system which substantially reduces the data storage requirements of each calculation stage and allows pipeline processing of the input data through the subsequent calculation stages of the system.

SUMMARY OF THE INVENTION

The need in the art is addressed by the improved digital signal processing system of the present invention which includes memory for storing an N-point sequence of input data points and corresponding coefficient values. A processor is included for computing the Fast Fourier Transform of the N-point sequence of input data points. In the illustrative embodiment, the processor consists of a series of (L) individual radix 2 processing stages, where L=log₂ N and N is number of input data points. Each radix 2 processing stage is adapted to perform radix 2 FFT ("butterfly") operations on the pairs of data points received by the processing stage. The outputs of each radix 2 processing stage are connected to the inputs of the succeeding processing stage through register buffers to accumulate the minimum set of operand terms required by a succeeding processing stage. This architecture allows the data points produced by each radix 2 processing stage to be immediately processed by the following stage. The sequence of data points produced by the last (Lth) radix 2 processing stage constitute the final results of the Fast Fourier Transform computation.

The invention offers an N fold increase of Fast Fourier Transform throughput over that of a single element performing Radix 2 Fast Fourier Transforms with no additional memory or I/O required except for the addition of a single memory (regardless of N) to provide additional access to twiddle factor coefficients. Once the additional memory is added for the Radix 4 case, no additional memory is needed as the radix is increased.

In accordance with the present teachings, the method of the invention includes the steps of:

a) storing first and second data values and a first coefficient in a first register stage;

b) storing the first and second data values and the first coefficient in a second register stage and storing third and fourth data values in the first register stage along with a second coefficient;

c) multiplying the second data value by the first coefficient and storing the product in a third register stage along with the first data value, moving the third and fourth data values into the second register stage along with the second coefficient and storing fifth and sixth data values in the first register stage along with a third coefficient;

d) combining the first data value with the product of the first coefficient and the second data value and storing the result in a fourth register stage;

e) combining the third data value with the product of the second coefficient and the fourth data value and storing the result in the fourth register stage; and f) passing terms generated by steps d) and e) to a first register stage of a subsequent processing stage and repeating steps a) through f) until the fast Fourier transform of the input signal is generated.

BRIEF DESCRIPTION OF THE DRAWINGS

FIG. 1 is a diagram showing the conversion of a continuous signal f(t) into discrete digital values using an analog-to-digital converter.

FIG. 3 is a diagram of the "butterfly" operator used in the flow diagram of FIG. 2.

DESCRIPTION OF THE INVENTION

Illustrative embodiments and exemplary applications are described below with reference to the accompanying drawings to disclose the advantageous teachings of the present invention.

Figure 2:
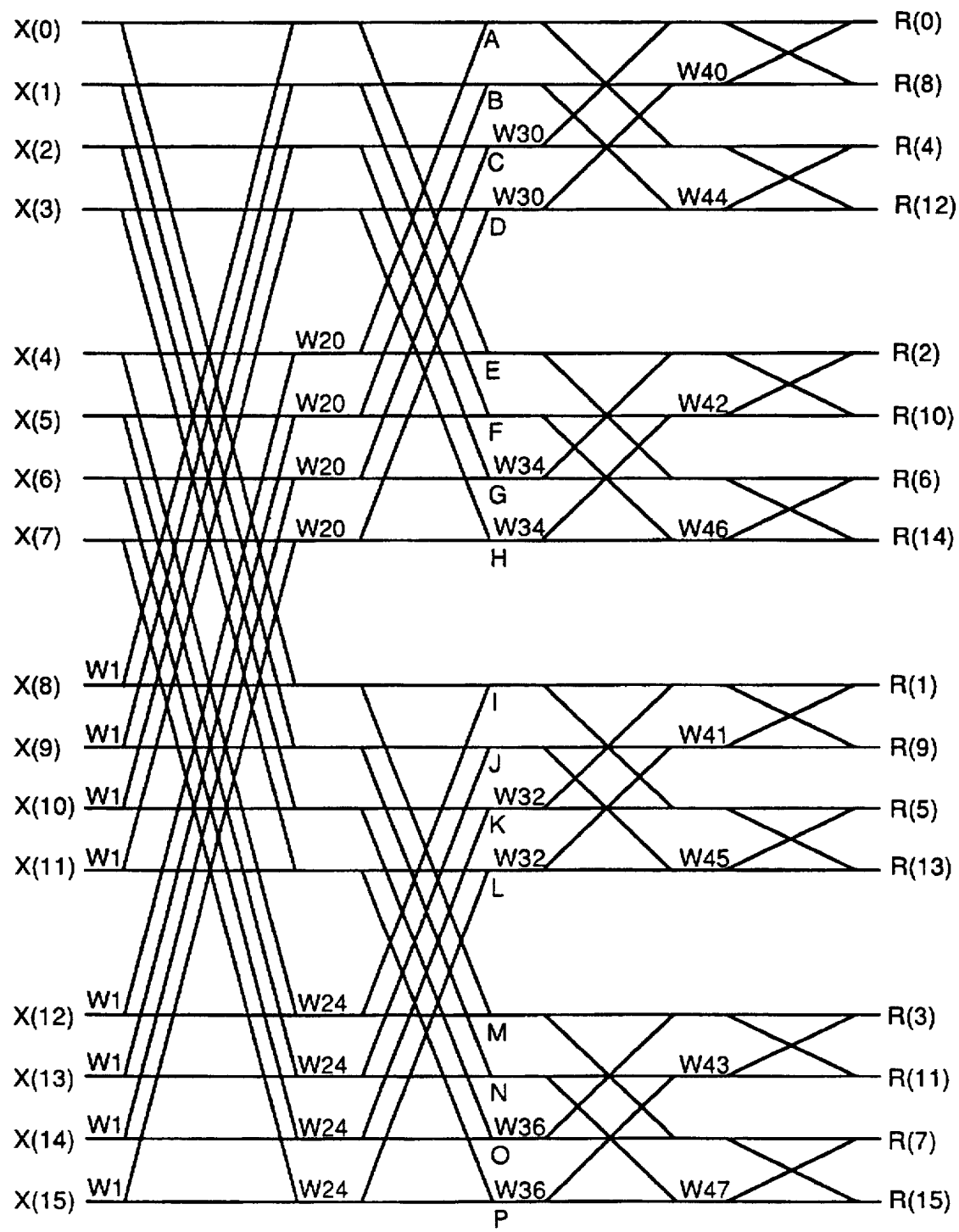
FIG. 2 is a flow diagram of a typical 16-point Fast Fourier Transform algorithm.
Figure 4:
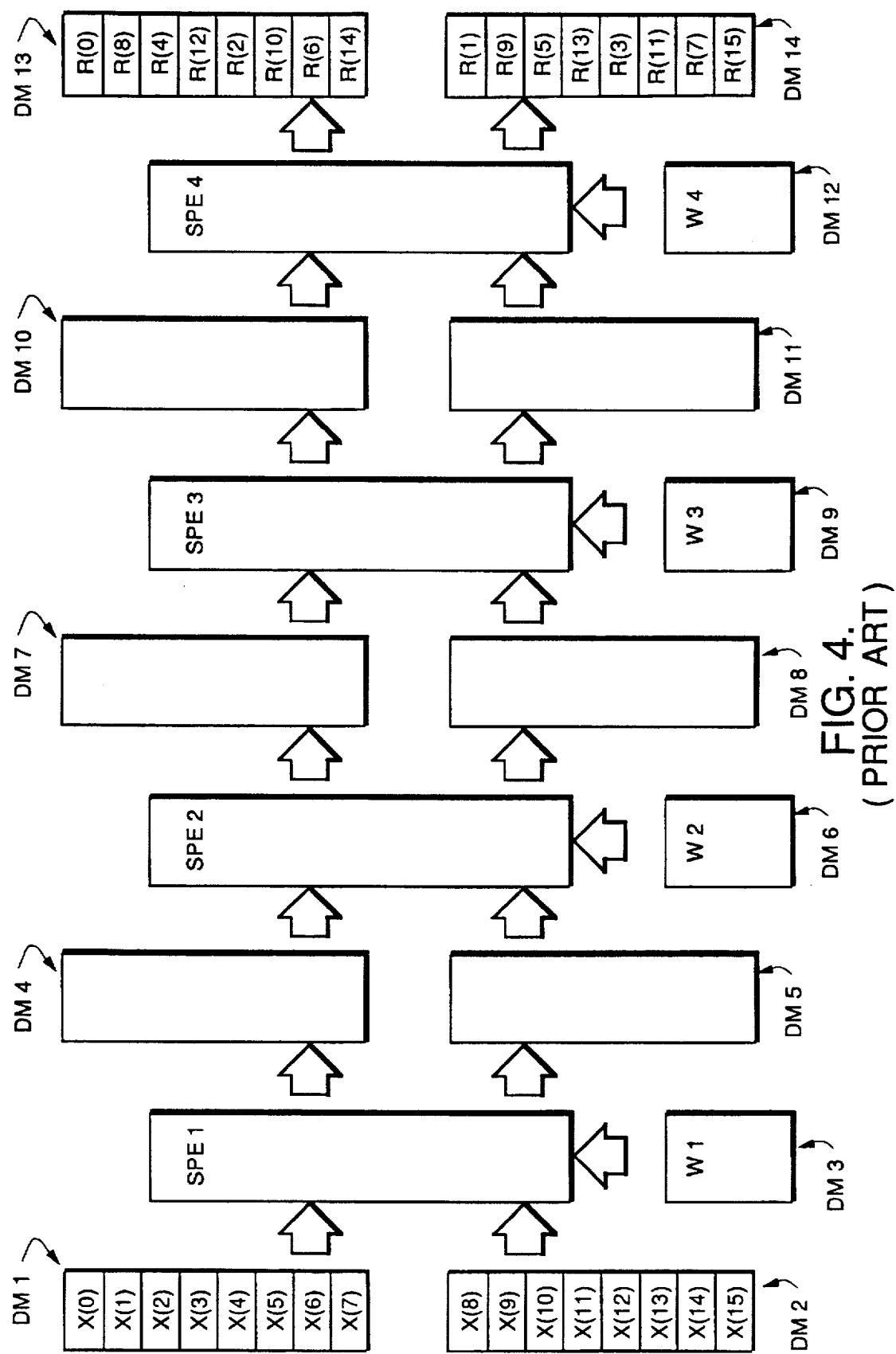
FIG. 4 is a block diagram of a conventional hardware implementation of the 16-point FFT algorithm shown in FIG. 2.
Figure 5:
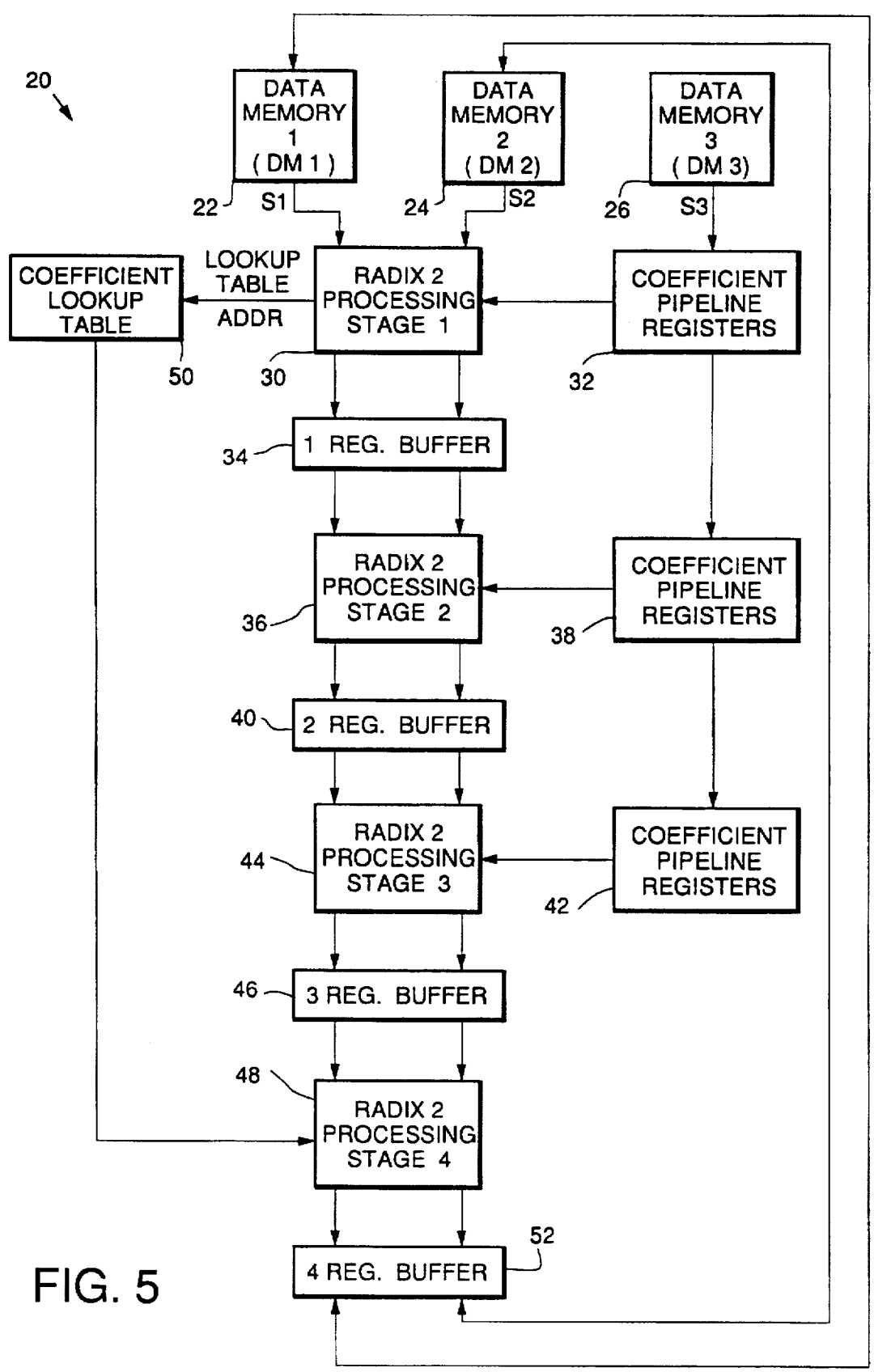
FIG. 5 is a simplified block diagram of a representative embodiment of the present invention (as configured for 16-point FFT computation).

Referring now to the drawings wherein like reference numerals designate like elements throughout, FIG. 5 is a simplified block diagram of the improved digital signal processing system 20 of the present invention. As discussed in detail below, the system 20 includes first, second and third memories 22, 24 and 26 for storing an N-point sequence of input data points and corresponding coefficient values. A processor is included for computing the Fast Fourier Transform of the N-point sequence of input data points. In the illustrative embodiment, the processor consists of a series of (L) individual radix 2 processing stages 30, 36, 44, and 48, where L=log$_2$ N (N=number of input data points). Each radix 2 processing stage is adapted to perform radix 2 FFT ("butterfly") operations on the pairs of data points received by the processing stage. The outputs of each radix 2 processing stage are connected to the inputs of the succeeding processing stage through register buffers 34, 40, 46 and 52 to accumulate the minimum set of operand terms required by a succeeding processing stage. This architecture allows the data points produced by each radix 2 processing stage to be immediately processed by the following stage. The sequence of data points produced by the last (Lth) radix 2 processing stage constitute the final results of the Fast Fourier Transform computation.

Although the system shown in FIG. 5 is configured to perform a 16-point Fast Fourier Transform, it should be noted that one skilled in the art with access to the present teachings will be able to configure the system to perform an N-point FFT operation.

The two data memories, DM1 and DM2 (22 and 24), store pairs of input data points to be processed. Coefficient values used in intermediate processing steps are stored in the third data memory, DM3 (26).

The pairs of input data points stored in data memories DM1 and DM2 (22, 24) are processed in order by a first radix 2 processor stage 30. As each pair of input data points is clocked into the first stage 30 of the processor, the appropriate coefficient value stored in the third data memory DM3 (26) is clocked into a first coefficient pipeline register 32. The first radix 2 processor stage 30 combines each pair of input data points with the appropriate coefficient value according to the "butterfly" operation shown in FIG. 3. The resulting pairs of output points produced by the first radix 2 processor stage 30 are clocked into a single register buffer 34 and the coefficient values contained in the first coefficient pipeline register 32 are clocked into a second coefficient pipeline register 38.

The second radix 2 processor stage 36 combines the pairs of data points output from the first radix 2 processor stage 30 with the appropriate coefficient value stored in the second coefficient pipeline register 38 according to the butterfly operation shown in FIG. 3. The resulting pairs of output points produced by the second radix 2 processor stage 36 are clocked into a double register buffer 40 and the coefficient values contained in the second coefficient pipeline register 38 are clocked into a third coefficient pipeline register 42.

The pairs of data points output from the second radix 2 processor stage 36 are processed in a similar manner by third and fourth radix 2 processor stages (44, 48). It should be noted that the final (fourth) radix 2 processor stage 48 differs from the preceding stages in that it receives coefficient values from a lookup table memory 50 instead of from a coefficient pipeline register. This is because although an N-point FFT requires up to N−1 unique coefficients, the FFT algorithm uses only half of the total number of coefficients in calculating all but the last stage of data terms. The coefficient pipeline registers 32, 38, 42 of the present invention provide the coefficients used by the radix 2 processing stages 30, 36, 44 which precede the last processing stage 48. The other half of the coefficient set (used by the last processing stage 48) is contained in a lookup table memory 50.

The pairs of data points output from the final (fourth) radix 2 processor stage 48 constitute the Fast Fourier Transform equivalents of the original input data points. This final sequence of data points can be stored in the data memories used to store the original input data points, DM1 and DM2 (22, 24).

The principal advantage offered by the present invention is the ability to perform multi-stage N-point FFT calculations in a pipelined fashion. Since each stage immediately processes the data output from a preceding stage, the amount of memory storage required between each processing stage is substantially reduced. The following example illustrates the pipelined processing operations performed by the present invention in the calculation of a 16-point FFT.

Figure 6:
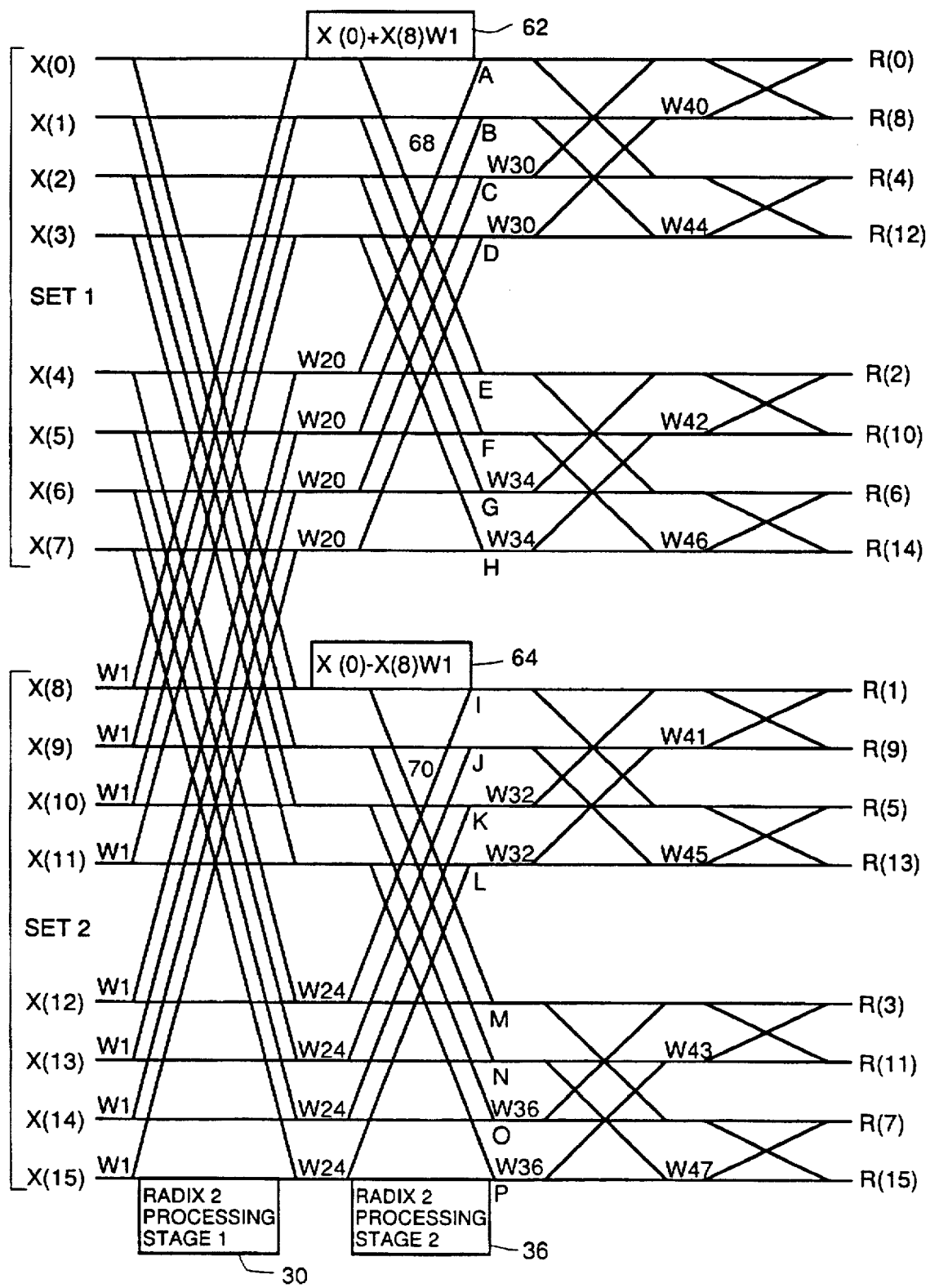
FIG. 6 is a flow diagram of the 16-point Fast Fourier Transform algorithm performed by the representative embodiment of the present invention.

FIG. 6 shows a flow diagram of the processing operations required to compute a 16-point FFT. The 16 input data points shown in the left side of the flow diagram (X(0) to X(15)) are organized as two sets of 8 data points [Set1=X(0) to X(7) and Set2=X(8) to X(15)]. The nth elements of each set of input data points constitute a pair of operands which are combined in the butterfly operation performed by the first radix 2 processing stage 30 shown in the flow diagram. For example, the first pair of data points to be processed are X(0) and X(8). Performing the butterfly operation shown in the flow diagram on this first pair of operands yields the following sum and difference terms: [X(0)+X(8)W1] (62) and [X(0)−X(8)W1] (64).

A conventional signal processing system would continue to perform the butterfly operation on the seven remaining pairs of input data points, storing the resulting sum and difference terms in a 16-element data memory. A second radix 2 processing stage 36 would then perform the butterfly operations shown in the flow diagram on the 8 pairs of sum and difference terms produced by the first radix 2 processing stage 30. The main drawback of this conventional method is that an N-element data storage memory is required between each processing stage as a temporary buffer to contain the sum and difference terms produced by each processing stage.

The improved system of the present invention overcomes this drawback by processing pairs of data points in an order which permits each processing stage to immediately begin processing the data points output from a preceding processing stage.

As shown in FIG. 6, the butterfly operation performed by the first radix 2 processing stage 30 on the first pair of input data points [X(0) and X(8)] yields the following sum and difference terms: [X(0)+X(8)W1] (62) and [X(0)−X(8)W1] (64). Each of these terms represents one half of the pair of operands used in the butterfly operations 68, 70 performed by the second radix 2 processing stage 36. The next pair of input data points to be processed by the first radix 2 processing stage 30 are chosen to produce the corresponding pair of data points used in the butterfly operations 68, 70 performed by the second radix 2 processing stage 36.

Figure 7:
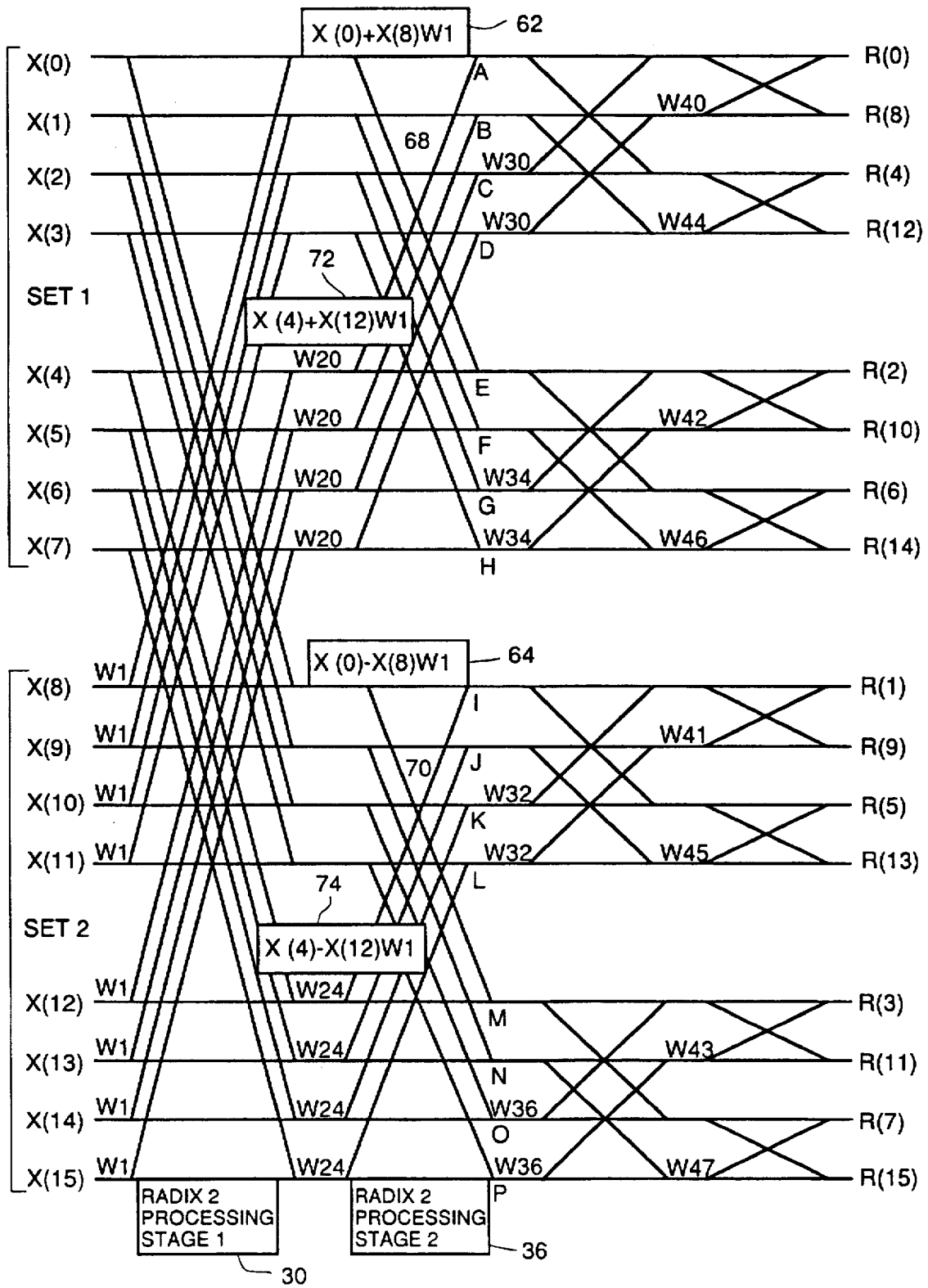
FIG. 7 is a version of the flow diagram of FIG. 6 which shows the first four sum and difference terms produced by the first radix 2 processing stage of the present invention.

As shown in FIG. 7, the second butterfly operation 76 performed by the first radix 2 processing stage 30 combines the data input points [X(4) and X(12)] to produce the following sum and difference terms: [X(4)+X(12)W1] (72) and [X(4)−X(12)W1] (74). These terms are then used by the second radix 2 processing stage 36 to perform the butterfly operations 68, 70.

The independent processing capability of the radix 2 processing stages facilitates the pipelined processing of the original 16 input data points. The sum and difference terms output from each processing stage are immediately used in the butterfly operations performed by the next processing stage. Regardless of the number of data points being processed, the only data storage required between each processing stage is an n-register buffer, where n is the number of the processing stage. The n-register buffer between each processing stage accumulates the minimum set of sum and difference terms necessary for the next processing stage to begin performing its set of butterfly operations.

The following section describes the internal structures of the radix 2 processing stages of the present invention and explains how these structures are used to implement pipelined processing of N-point FFTs.

Referring to the flow diagram of FIG. 6, it can be seen that the initial butterfly operations performed on the two sets of input data points [X(0) to X(7) and X(8) to X(15)] are implemented by the first radix 2 processing stage 30.

Figure 8:
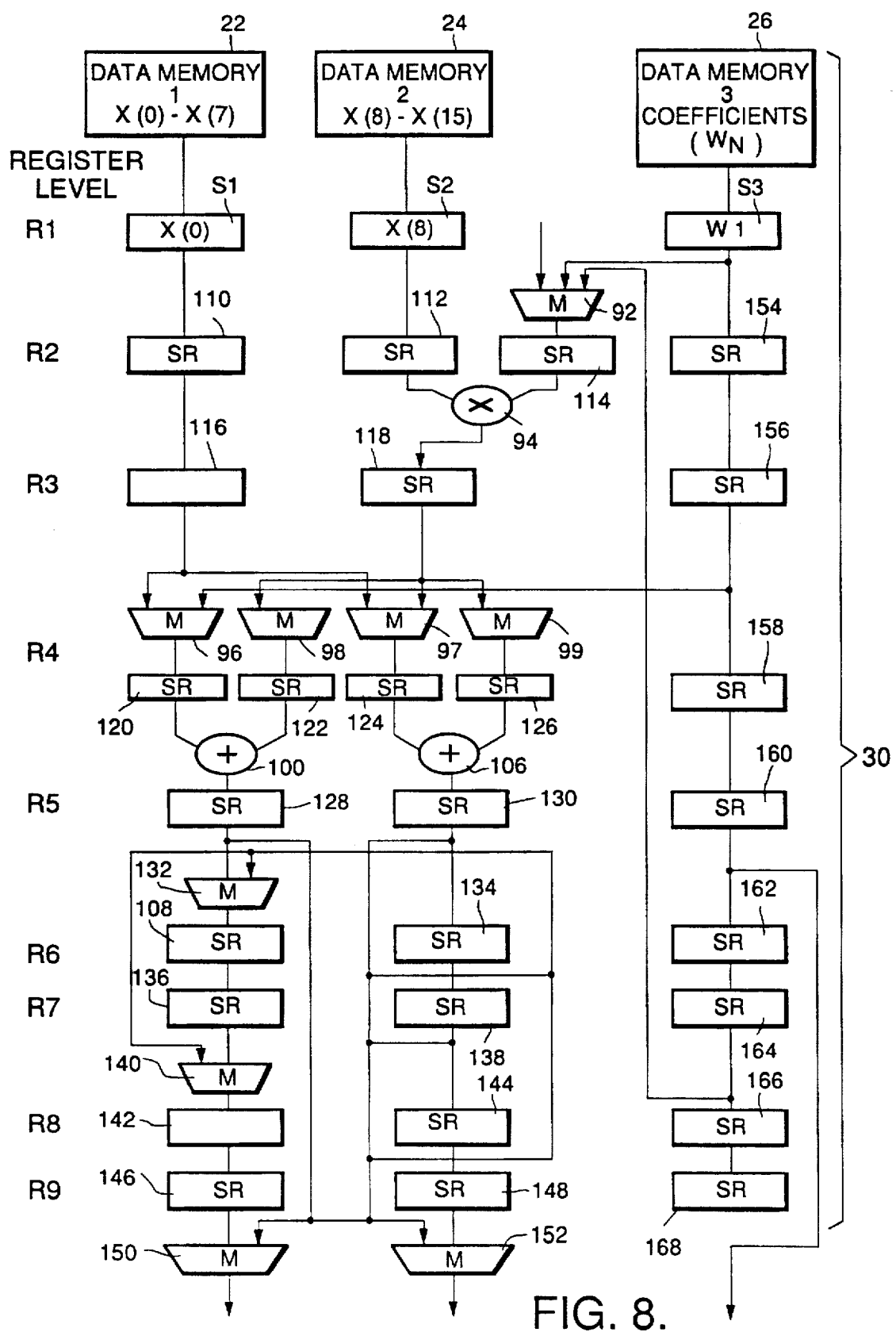
FIG. 8 is a block diagram of the internal structure used in the radix 2 processor stages of the present invention. The diagram shows the state of the first radix 2 processing stage after an initial pair of data points has been clocked into the first register level of the processing stage.

The internal architecture of this first radix 2 processing stage 30 is shown in FIG. 8. In the diagram of FIG. 8, rectangular symbols represent storage registers, trapezoidal symbols represent multiplexers, and circular symbols represent adder/subtractors or multipliers. Each processing stage includes a plurality of registers (such as the first level registers S1, S2, and S3) for storing data terms, and a plurality of multiplexers (such as the multiplexers 96, 97, 98, 99 connected to the fourth level registers) for routing the data terms to the appropriate registers. Each processing stage also includes one multiplier 94 and three adder/subtractors 100, 106, 107 for calculating the complex additions and subtractions used in the butterfly operation. It should be noted that the internal architecture of the radix 2 processing stages utilized in the present invention are identical. The first radix 2 processing stage 30 receives input data values to be processed through three input channels S1, S2 and S3. These input channels are connected to the three data memories 22, 24, and 26 which contain the two sets of data input points and the coefficient values used in the butterfly operations performed by the processing stage.

The diagram of FIG. 8 shows the state of the first processing stage after the first pair of data points [X(0) and X(8)] and the corresponding coefficient value (W1) have been clocked into the first register level R1 of the processing stage. The following sequence of diagrams traces the progress of this initial set of data points as they are processed by the first radix 2 processing stage 30.

Figure 9:
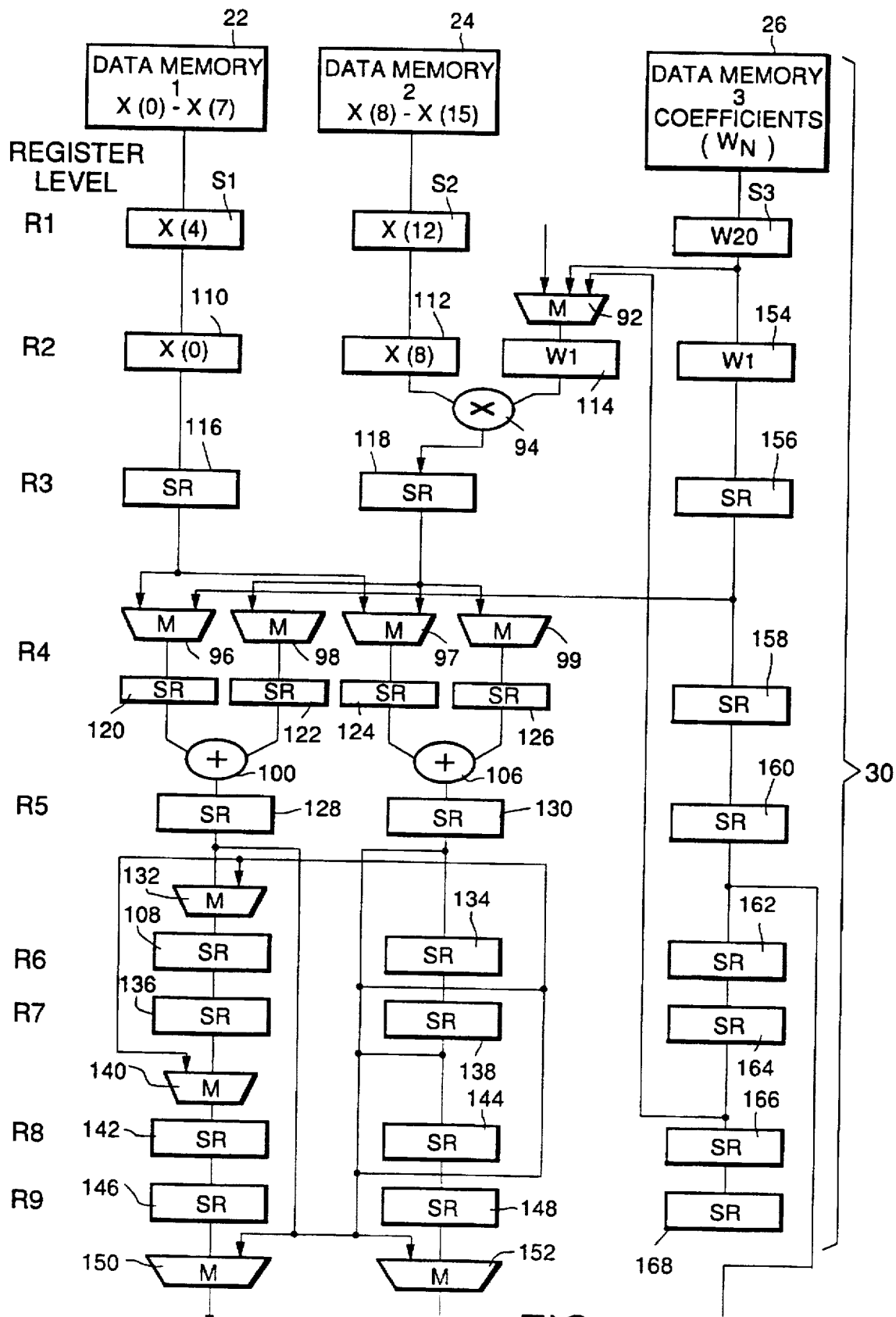
FIG. 9 is a diagram showing the state of the first radix 2 processing stage after the initial pair of data points has been clocked into the second register level of the processing stage.

FIG. 9 shows the state of the first radix 2 processing stage 30 after the initial set of data points have been clocked into the second register level of the processor R2. Note that a first multiplexer 92 has routed the coefficient value W1 to one of the inputs of a first multiplier 94. The data point X(8) provides the other input to the multiplier 94. These two terms will be multiplied together in the next processing step performed by the first processing stage 30. Note that the second pair of data points to be processed [X(4) and X(12)] and the corresponding coefficient value (W20) have also been clocked into the first register level of the processor.

Figure 10:
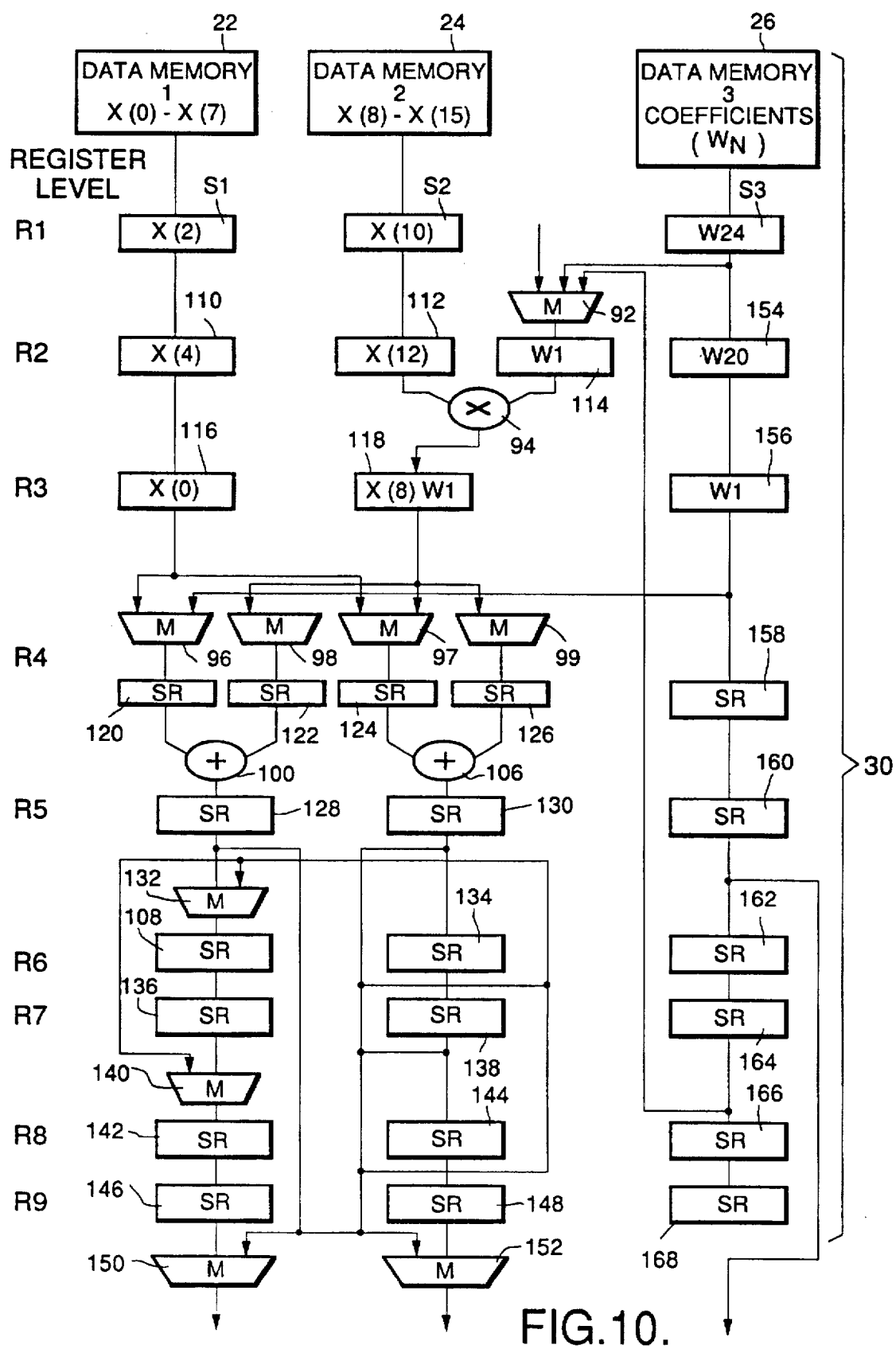
FIG. 10 is a diagram showing the state of the first radix 2 processing stage after the initial pair of data points has been clocked into the third register level of the processing stage.

FIG. 10 shows the next processing step performed by the first processing stage 30. As shown in the third register level of the diagram R3, the first multiplier 94 has computed the product [X(8)W1] of the two input terms shown in the previous diagram (FIG. 9). The next two terms [X(12) and W1] to be processed by the first multiplier 94 have also been clocked into the second register level of the first processing stage 30.

Figure 11:
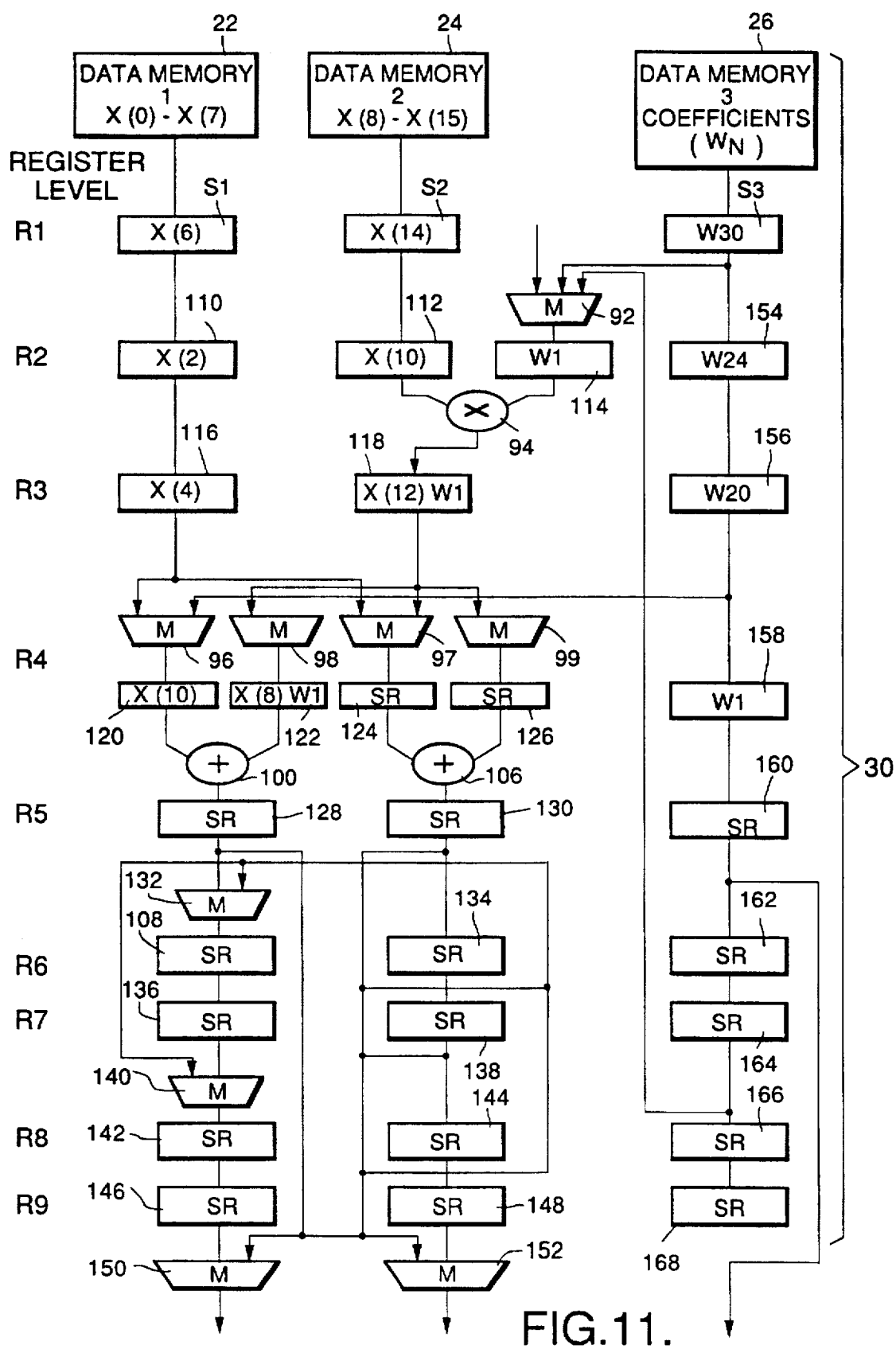
FIG. 11 is a diagram showing the state of the first radix 2 processing stage after the initial pair of data points has been clocked into the fourth register level of the processing stage.

FIG. 11 shows the state of the first processing stage 30 after the completion of the next processing step. As shown in the fourth register level of the diagram R4, the two multiplexers 96 and 98 have routed the terms X(0) and [X(8)W1] to the inputs of a first adder/subtractor 100.

Figure 12:
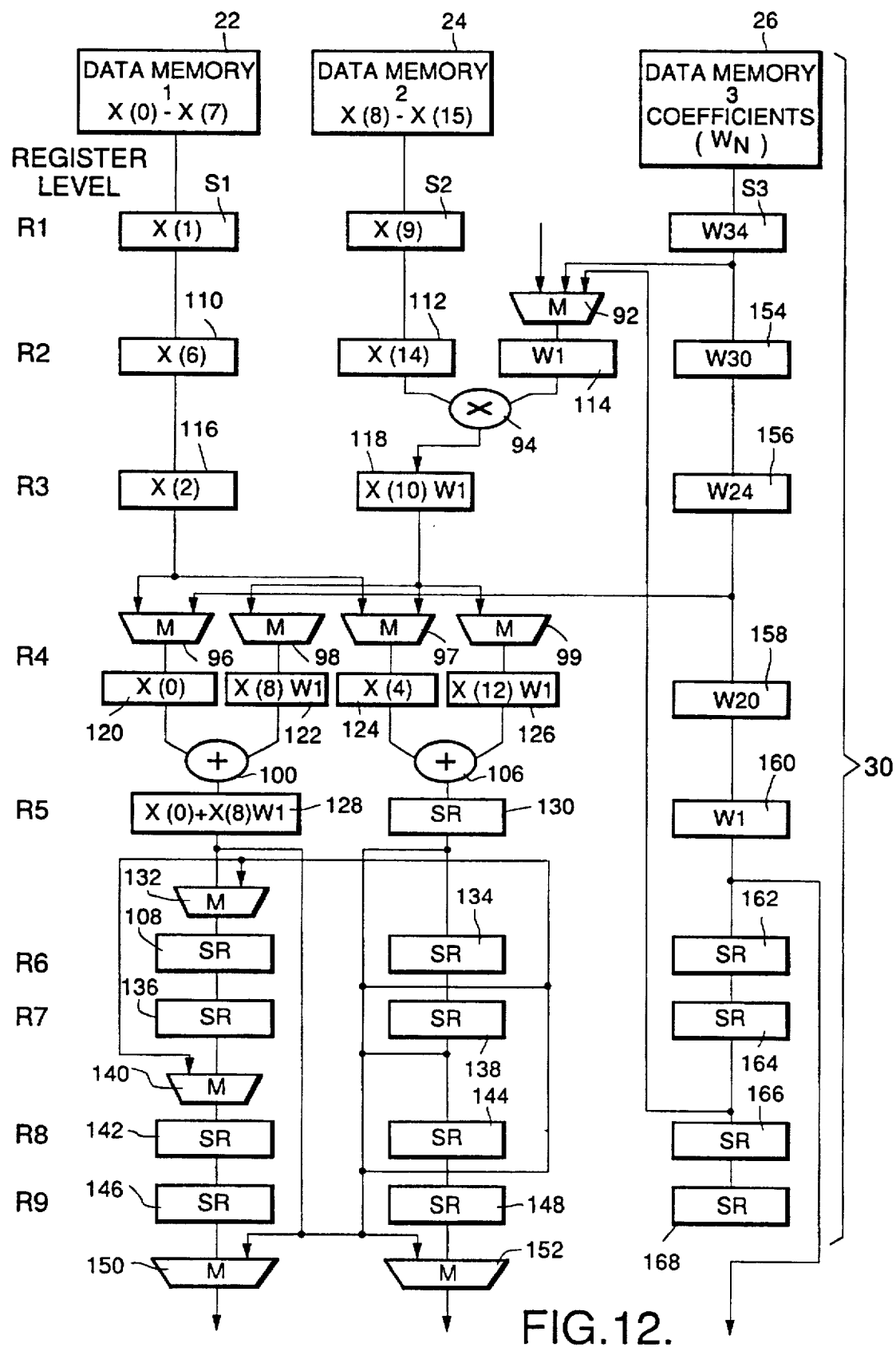
FIG. 12 is a diagram showing the state of the first radix 2 processing stage after the first complex sum term[X(0)+X(8)W1] has been computed and clocked into the fifth register level of the processing stage.

The state of the first processing stage 30 following the completion of the next processing step is shown in FIG. 12. As shown in the fifth register level of the diagram R5, the first adder/subtractor 100 has computed the sum [X(0)+X(8)W1]. Note that the terms [X(0) and X(8)W1] just processed by the first adder/subtractor 100 have not been overwritten by a new set of operands clocked in from the preceding register level. Instead, the operands from the preceding register level [X(4) and X(12)W1] have been routed to the inputs of a second adder/subtractor 106. This arrangement permits the first and second adder/subtractors 100 and 106 to operate simultaneously, facilitating the pipelined processing of the data points being processed.

Figure 13:
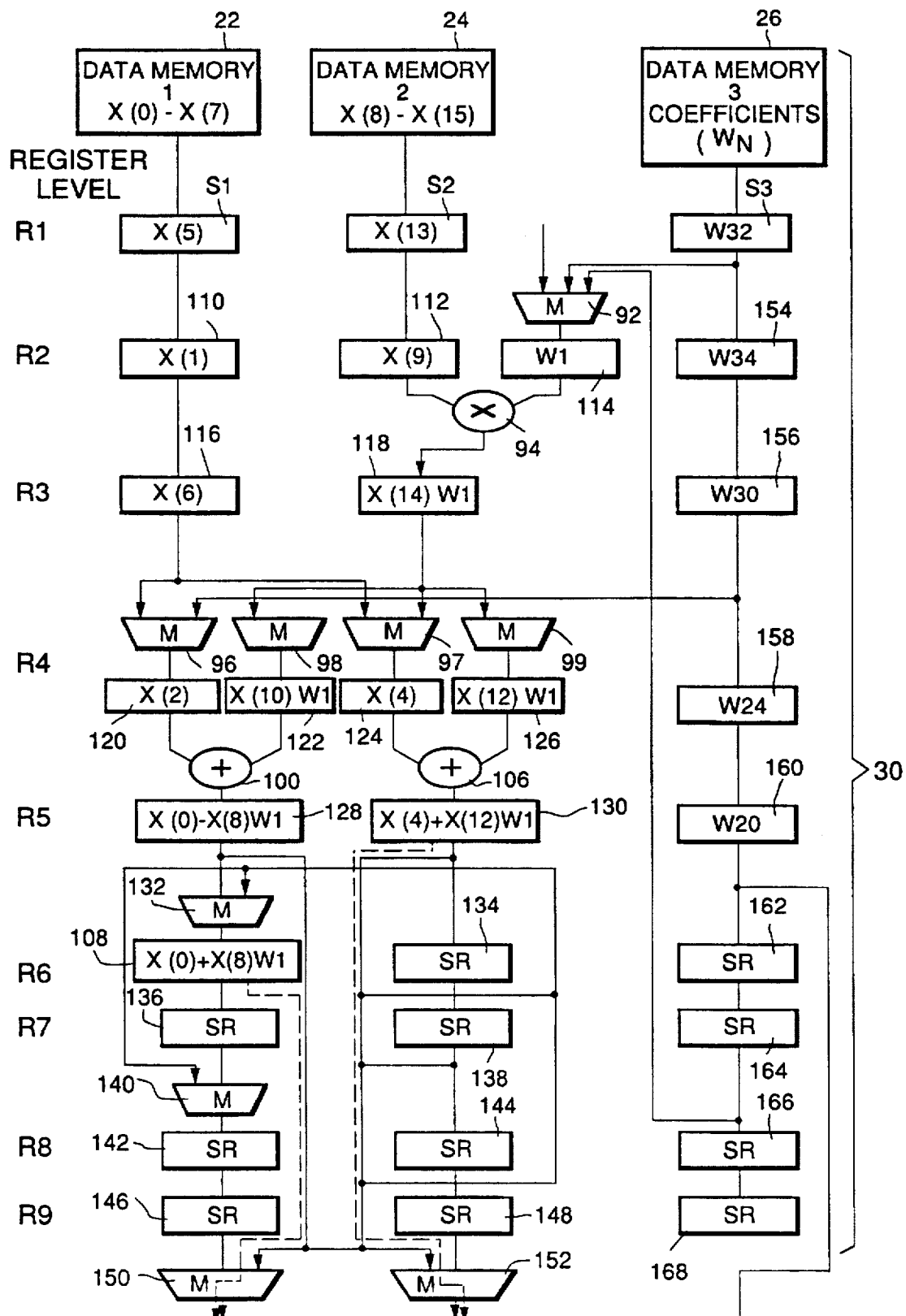
FIG. 13 is a diagram showing the state of the first radix 2 processing stage after the second complex sum term[X(4)+X(12)W1] has been computed and clocked into the fifth register level of the processing stage. The diagram also shows that the first two complex sum terms [X(0)+X(8)W1], [X(4)+X(12)W1] will be output from the first processing stage during the next clock cycle.

The state of the first processing stage 30 following the completion of the next processing step is shown in FIG. 13. As shown in the sixth register level of the diagram R6, the term [X(0)+X(8)W1] has been clocked into a first buffer register 108. The terms produced by the first and second adder/subtractors 100 and 106 are shown in the fifth register level of the diagram R5. The first adder/subtractor 100 has computed the difference term [X(0)−X(8)W1]. The second adder/subtractor 106 has computed the sum term [X(4)+X(12)W1].

At this point, the first processing stage 30 has produced the first pair of terms, [X(0)+X(8)W1] and [X(4)+X(12) W1], which can be immediately processed by a second radix 2 processing stage. This can be seen with reference to the flow diagram of FIG. 7. As shown in FIG. 7, these terms, [X(0)+X(8)W1] and [X(4)+X(12)W1] (62 and 72), constitute the two operands used in the butterfly operation 68 performed by the second radix 2 processing stage 36. Therefore, these terms will be clocked out of the first processing stage 30 (and into the single register buffer 34 to be processed by the second radix 2 processor) as indicated by the dotted lines shown in FIG. 13. The selection and ordering of the data terms clocked out of a particular processing stage is a function of the stage's location in the processing pipeline. Each processing stage contains a hard-wired identification code which defines its location in the processing pipeline and also determines the selection and ordering of the data terms clocked out of the processing stage.

Figure 14:
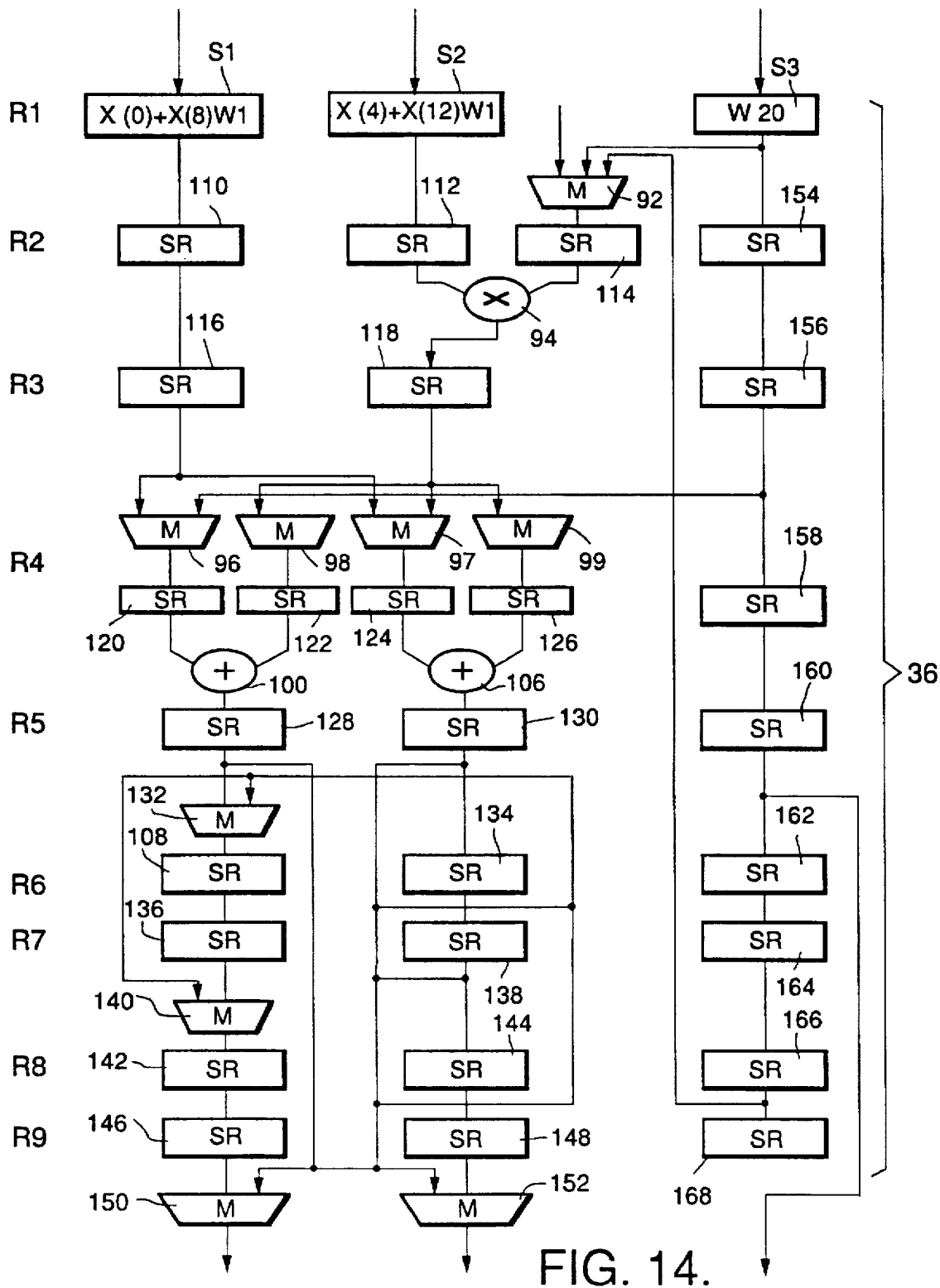
FIG. 14 is a diagram which shows the state of the second radix 2 processing stage after the next clock cycle has elapsed. The diagram shows that the two complex sum terms [X(0)+X(8)W1], [X(4)+X(12)W1], output from the first processing stage have been clocked into the first register level of the second radix 2 processing stage.

FIG. 14 shows the state of the second radix 2 processing stage 36 after the completion of the next step executed by the first radix 2 processing stage. As shown in diagram, the data terms [X(0)+X(8)W1], [X(4)+X(12)W1], and the coefficient value W20 have been clocked into the first register level of the second radix 2 processing stage 36.

As shown in FIG. 14, the internal structure of the second radix 2 processing stage 36 is identical to that of the first processing stage shown in FIG. 13. The second radix 2 processing stage 36 uses the data terms received from the first processing stage to perform the second level of butterfly operations shown in the flow diagram of FIG. 7.

The data terms output by the second radix 2 processor stage 36 are processed in a similar pipelined manner by a third and fourth radix 2 processing stage. The 16 data terms produced by the fourth radix 2 processing stage represent the final results of the 16-point FFT performed by the present invention. By the time the first data point emerges from the fourth radix 2 processing stage, all of the input data points originally stored in the first and second data memories 86, 88 shown in FIG. 13 have been clocked into the first radix 2 processing stage 30. Therefore, the final 16 data terms output from the fourth radix 2 processing stage can be stored back into the first and second data memories 86,88 as they are produced.

The present invention has been described herein with reference to a particular embodiment for a particular application. Nonetheless, the invention is not limited thereto. Those of ordinary skill in the art and access to the teachings provided herein will recognize additional modifications, applications, and embodiments within the scope thereof. For example, the processing stages may be implemented with suitably programmed microprocessors.

It is intended by the appended claims to cover any and all such modifications, applications, and embodiments within the scope of the invention.

Accordingly,
What is claimed is:
1. A signal processing system comprising:
    data storage means for storing a sequence of input data points;
    N processing stages of radix 2 processors connected in a pipeline configuration for performing butterfly operations on said sequence of data points to provide a plurality of output operands each of which is output from each stage of processors, wherein each of said radix 2 processors includes a register for storing input data, coefficient values and intermediate data terms, a multiplier for performing complex multiplication operations on said stored input data and coefficient values, an adder/subtractor for performing complex addition and subtraction operations on said input data values and intermediate terms, wherein said where N is an integer greater than 1, and further wherein each processing stage comprises (i) first register for storing first and second data values and a first coefficient, (ii) second register for storing said first and second data values and said first coefficient while said third and fourth data values are stored in said first register along with a second coefficient, (iii) multiplier for multiplying said second data value by said first coefficient and storing the product in third register along with said first data value, said multiplier including means for providing said third and fourth data values into said second register along with said second coefficient and means for storing fifth and sixth data values in said first register-stage along with a third coefficient, (iv) first combiner for combining said first data value with the product of said first coefficient and said second data value and for storing the result in a fourth register, (v) second combiner for combining said third data value with the product of said second coefficient and said fourth data value and for storing the result in said fourth register, and (vi) means for passing terms generated by said first and second combiner to a first register of a subsequent processing stage; and a plurality of n-register buffers, where n is the number of the processing stage and ranges from 1 to N−1, an associated n-register buffer being connected between the nth and the n+1th stages of said processors for storing said plurality of output operands.

* * * * *